United States Patent
Powell et al.

[11] Patent Number: 5,807,086
[45] Date of Patent: Sep. 15, 1998

[54] SEAL CHAMBER SPLASH GUARD

[75] Inventors: Jack Joseph Powell, Kettering; Robert Scott Wallace, Centerville, both of Ohio

[73] Assignee: The Duriron Company, Inc., Dayton, Ohio

[21] Appl. No.: 698,910

[22] Filed: Aug. 16, 1996

[51] Int. Cl.⁶ .............................. F04B 39/12; F16P 1/02
[52] U.S. Cl. ................................................ 417/572; 74/608
[58] Field of Search ................................ 417/572, 902, 417/313; 384/477, 130; 418/104, 133, 149; 150/154, 157; 74/608, 609

[56] References Cited

U.S. PATENT DOCUMENTS

| | | | |
|---|---|---|---|
| 2,971,800 | 2/1961 | Ruthner | 384/477 |
| 3,338,355 | 8/1967 | Kyllonen | 192/41 R |
| 3,638,503 | 2/1972 | Stipanovic et al. | 74/18 |
| 3,646,758 | 3/1972 | Cripe | 60/397 |
| 3,660,213 | 5/1972 | Moseley | 161/7 |
| 3,696,689 | 10/1972 | Senter et al. | 74/609 |
| 3,822,570 | 7/1974 | Fisher | 464/146 |
| 4,279,571 | 7/1981 | Erickson | 415/89 |
| 4,439,096 | 3/1984 | Rockwood et al. | 415/131 |
| 4,501,530 | 2/1985 | Rockwood et al. | 415/170 |
| 4,701,103 | 10/1987 | Medgvesy | 415/219 |
| 4,932,275 | 6/1990 | Bischoff et al. | 74/608 X |
| 4,981,304 | 1/1991 | Bice et al. | 277/212 |
| 5,077,000 | 12/1991 | Bice et al. | 376/308 |
| 5,340,273 | 8/1994 | Rockwood | 415/113 |
| 5,401,141 | 3/1995 | Siebenwurst | 417/68 |
| 5,474,420 | 12/1995 | Ostberg . | |

FOREIGN PATENT DOCUMENTS 61-250400  7/1986  Japan .

OTHER PUBLICATIONS

Finger Guard Drawing Nos. BY55955A; & CY 55955A; Jun. 1, 1995.

*Primary Examiner*—Ismael Izaguirre
*Attorney, Agent, or Firm*—Killworth, Gottman, Hagan & Schaeff LLP

[57] ABSTRACT

A pump guard comprising a transparent, flexible, and resilient material including a shielding portion adapted to define a seal chamber in the proximity of a seal of a pump and a pump engaging portion substantially conforming to the shape of a guard engaging portion of said pump. The shielding portion deflects any fluid spraying or leaking from the seal. The pump guard 2 is of unitary construction, requires no mounting hardware, and is easily installable about the seal 16 to define a seal chamber.

24 Claims, 3 Drawing Sheets

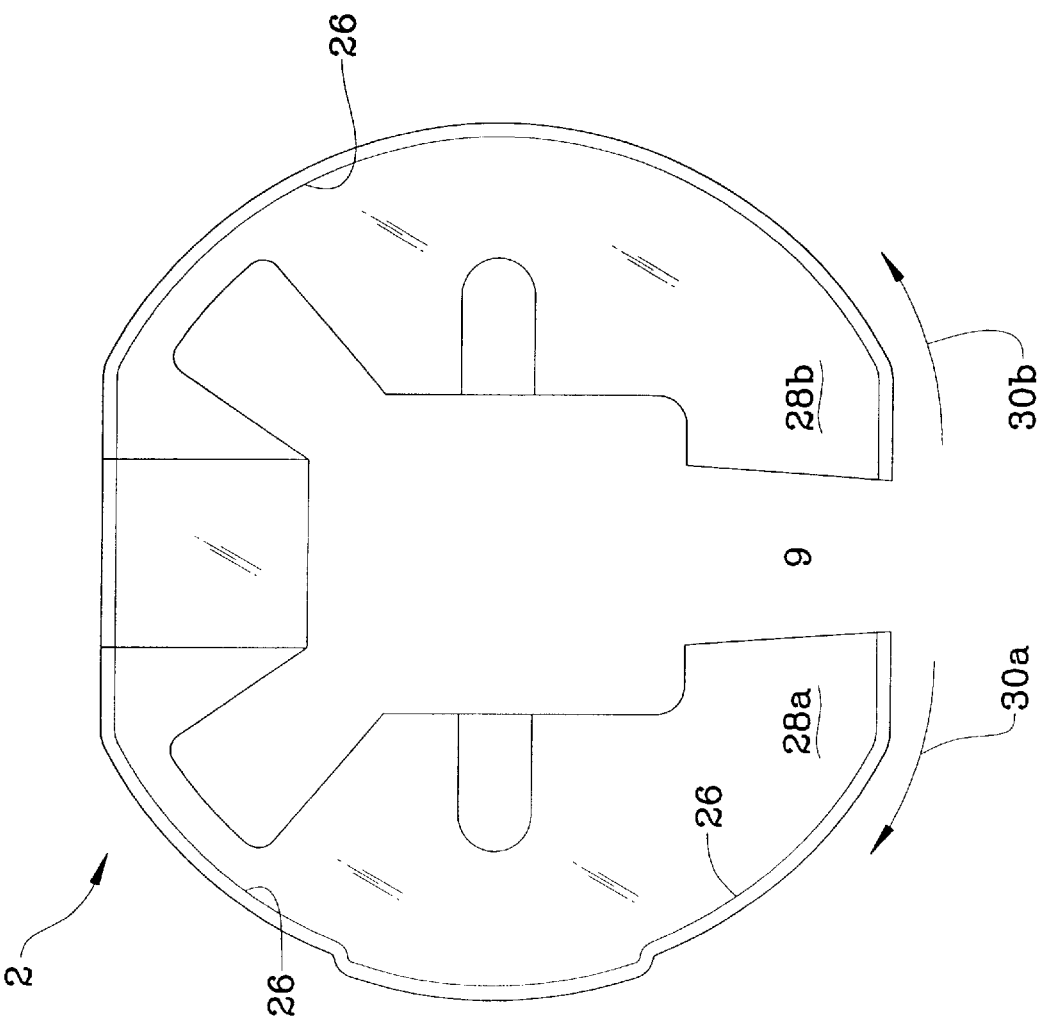
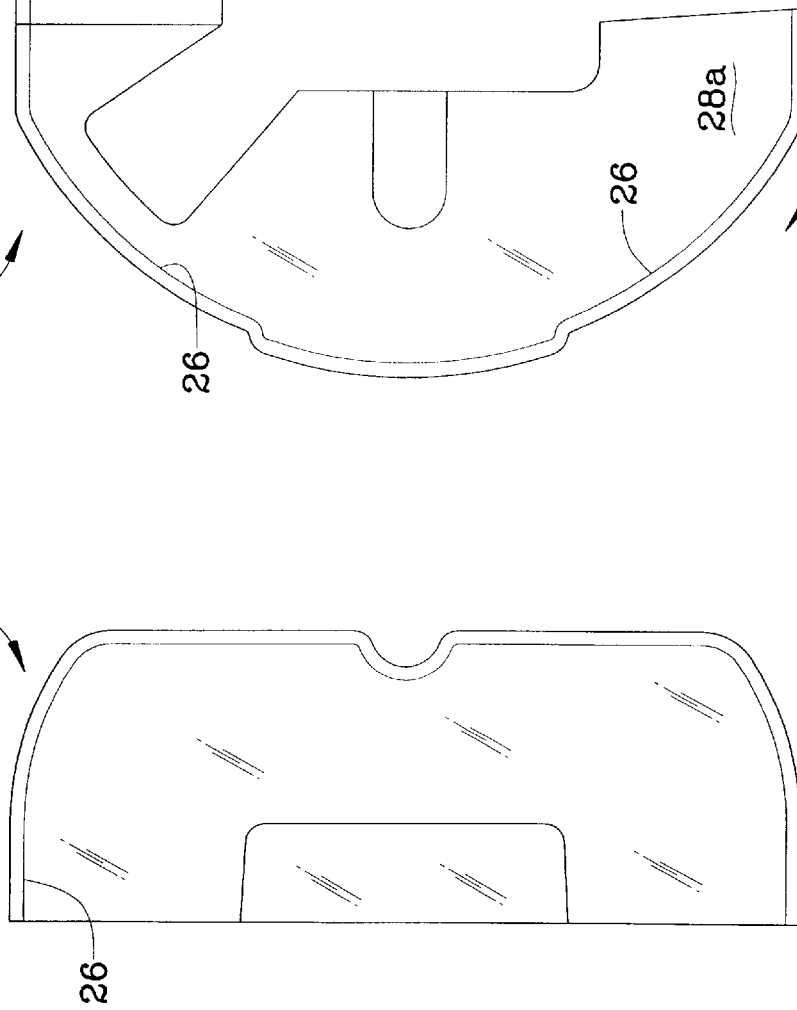

SEAL CHAMBER SPLASH GUARD

BACKGROUND OF THE INVENTION

The present invention relates to materials pumping and, specifically, to a seal chamber guard for a pump.

FIG. 5 illustrates a conventional pump 10 including a bearing housing 12, a rotary pump drive 14, a mechanical seal 16, an impeller casing 18, a pump inlet 20 and a pump outlet 22. As FIG. 5 clearly shows, the mechanical seal 16 is coupled to the rotary pump drive 14 and is exposed to the ambient. Accordingly, if a leak develops in the mechanical seal 16, fluid within the impeller casing 18 will move freely into the ambient. Further, if a leak develops in the mechanical seal 16 while the pump drive 14 is rotating, fluid within the impeller casing 18 will move into the ambient in the form of a multi-directional spray. If a hazardous or noxious material is present in the impeller casing 18, the above described leaks can present a significant safety hazard to persons near the pump and can also threaten the physical integrity of adjacent machinery.

The rotary pump drive 14 and associated hardware rotate at a high rate. Accordingly, because the mechanical seal 16 and the pump drive 14 are exposed to the ambient, any personnel adjacent the pump 10 risk injurious incidental contact with the rapidly moving pump hardware. Some pumps have been provided with stainless steel finger guards bolted to the bearing housing 17 to reduce the danger of incidental contact with rotating pump hardware. However, these finger guards are difficult to install and remove, impede pump maintenance because they block access to pump hardware, impede visual pump inspection because of their stainless steel construction, and do not adequately deflect fluid leaking or spraying from the pump seal.

Accordingly, there is a need for a pump guard which is readily installable and removable, will protect personnel from any flying debris in the event of a seal breaking apart, offers initial protection from hazardous leaks, protects against fingers, hands, clothing, etc., coming into contact with the rotating shaft of a motor, and permits convenient visual pump inspection.

SUMMARY OF THE INVENTION

This need is met by the present invention wherein is provided a transparent, flexible, and resilient pump guard, designed so as to be readily installable and removable about a seal of a pump.

In accordance with one embodiment of the present invention, a pump guard is provided comprising a flexible and resilient cross sectional portion having a natural cross sectional shape substantially conforming to the shape of a guard engaging portion of a pump, the flexible and resilient cross sectional portion being capable of deformation from the natural cross sectional shape to a deformed cross sectional shape and return to the natural cross sectional shape.

The pump guard preferably comprises a plurality of flexible and resilient cross sectional portions having respective natural cross sectional shapes substantially conforming to the shape of corresponding guard engaging portions of the pump, the plurality of flexible and resilient cross sectional portions being capable of deformation from the respective natural cross sectional shapes to respective deformed cross sectional shapes and return to the respective natural cross sectional shapes.

The cross sectional portion may follow a substantially circular contour and may include a cross sectional gap adapted to permit deformation of the pump guard.

The pump guard is preferably adapted to define a seal chamber in the proximity of a pump seal, and the cross sectional gap is positioned so as to permit drainage of fluid from the seal chamber. Further, the pump guard is preferably adapted to deflect fluid leaking from the seal and to prevent passage of a fluid therethrough. The pump guard preferably comprises a transparent, flexible, and resilient material, e.g., a polycarbonate resin. The flexible and resilient material may comprise a polycarbonate having a thickness of about 3/16" (0.48 cm). The pump guard is preferably a unitary structure and requires no guard mounting hardware.

In accordance with another embodiment of the present invention, a method of installing a pump guard is provided comprising the steps of: deforming at least one flexible and resilient cross sectional portion of a pump guard from a natural cross sectional shape to a deformed cross sectional shape; positioning the pump guard adjacent a seal of a pump; and returning the at least one cross sectional portion of the pump guard to the natural cross sectional shape following the positioning step wherein the natural cross sectional shape substantially conforms to the shape of a guard engaging portion of the pump.

The method of installing a pump guard preferably further comprise the steps of: deforming a plurality of flexible and resilient cross sectional portions of the pump guard from respective natural cross sectional shapes to respective deformed cross sectional shapes; positioning the pump guard adjacent a seal of a pump; returning the plurality of cross sectional portions of the pump guard to the respective natural cross sectional shapes following the positioning step wherein the respective natural cross sectional shapes substantially conform to the shape of a guard engaging portion of the pump.

The positioning step preferably comprises enclosing the seal with the pump guard so as to define a seal chamber of the pump and/or positioning a cross sectional gap provided in the pump guard so as to permit drainage of fluid from the seal chamber.

In accordance with yet another embodiment of the present invention, a pump guard is provided comprising a flexible and resilient material, the pump guard being shaped so as to form a shielding portion and a pump engaging portion, wherein the shielding portion is adapted to define a seal chamber in the proximity of a seal of a pump, and wherein the pump engaging portion substantially conforms to the shape of a guard engaging portion of the pump.

The shielding portion is preferably adapted to prevent passage of a fluid therethrough. Further, a cross sectional portion of the pump guard may follow a substantially circular contour. A fluid drainage portion may be formed in the shielding portion so as to permit drainage of fluid from the seal chamber. The flexible and resilient material may comprise a transparent material, e.g., a polycarbonate resin.

Accordingly, it is an object of the present invention to provide a transparent, flexible, and resilient pump guard which permits convenient installation and removal about a seal of a pump.

BRIEF DESCRIPTION OF THE DRAWINGS

FIG. 2 is a side view of the pump guard illustrated in FIG. 1;

FIG. 3 is a top view of the pump guard illustrated in FIG. 1;

DETAILED DESCRIPTION OF THE INVENTION

Figure 1:
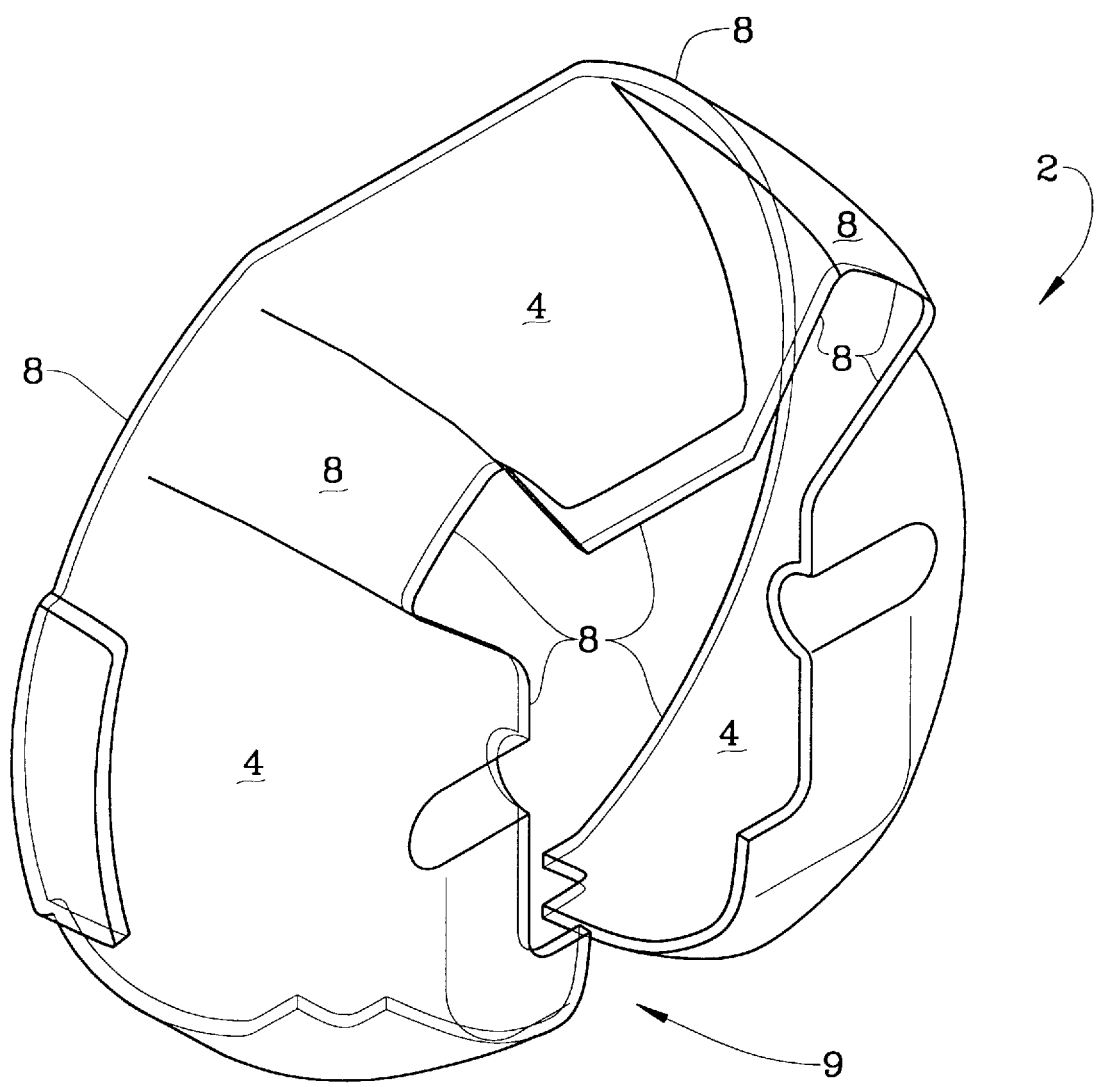
FIG. 1 is a perspective view of a transparent pump guard in accordance with the present invention.
Figure 4:
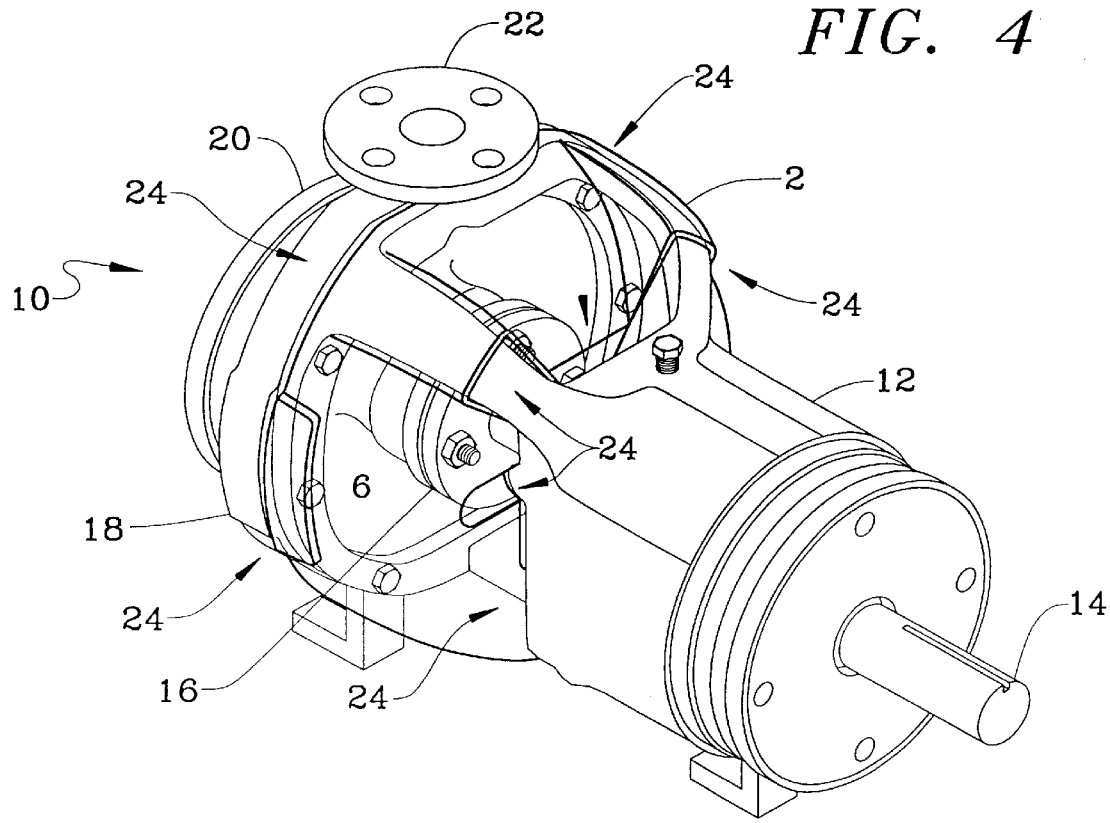
FIG. 4 is a perspective view of a transparent pump guard according to the present invention mounted upon a conventional pump.
Figure 5:
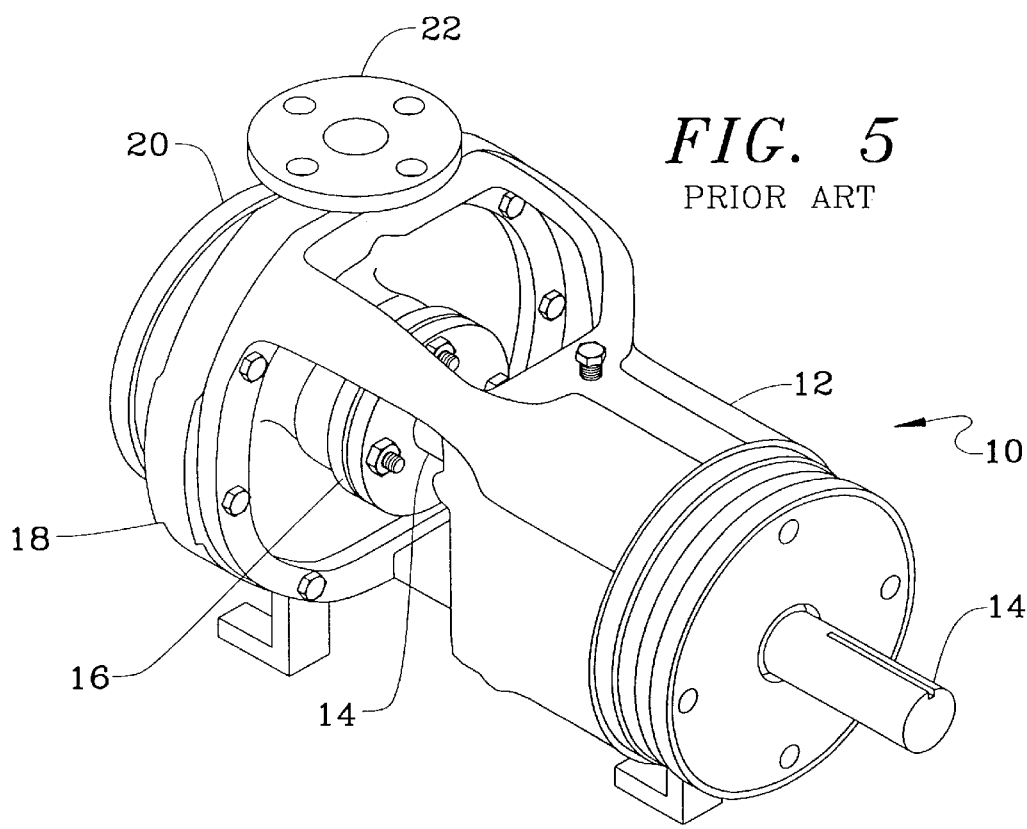
FIG. 5 is a perspective view of a conventional pump.

A pump guard 2 according to the present invention is illustrated in FIGS. 1–4. The pump guard 2 is formed so that its natural or original shape includes pump engaging portions 8 which substantially conform to the shape of guard engaging portions 24 of a pump 10 upon which it is to be installed, i.e., the natural shape of the pump guard 2 does not necessarily exactly match the exterior dimensions of the guard engaging portions 24 of the pump 10 but, rather, matches closely enough to produce a secure engagement of the pump guard 2 and the guard engaging portions 24 of the pump 10. In this manner, upon installation, the pump guard 2 requires no guard mounting hardware to secure the guard 2 to the pump 10.

The pump guard 2 is preferably a single molded piece, or unitary, construction; although, it may be formed in pieces and then fusion molded or otherwise bonded into a unitary construction. Pump guard 2 includes a shielding portion 4 which defines a seal chamber 6 in the proximity of a mechanical pump seal 16. The shielding portion 4 is adapted to prevent passage of a fluid therethrough because the pump guard 2 is formed from a polycarbonate resin or another similarly suitable transparent or translucent plastic material and because the shielding portion 4 forms a continuous surface. Specifically, the size and shape of the pump guard 2 is such that, when installed on or placed into engagement with the pump 10, the guard 2 will enclose the seal 16 of the pump 10 and a volume of space adjacent the seal 16 so as to define a seal chamber 6 and enable deflection of a fluid leaking or spraying from the seal. The pump guard 2 is of sufficient thickness, e.g., about ³⁄₁₆" (0.48 cm), and rigidity so as to deflect fluid spraying from the seal 16 of the pump 10 as a result of a leak in the pump seal 16 and to permit convenient trimming of portions of the pump 10 with a standard plastic cutting tool, i.e, portions of the guard 2 may be conveniently trimmed and/or removed by cutting, slicing, sawing, or otherwise trimming the guard 2 with industry standard plastic saws, cutters, slicers, etc. It will be appreciated by one skilled in the art that non-uniformities in the thickness of the guard 2 will occur as a result of deformation during the molding process.

The pump guard 2 is constructed of a flexible and resilient plastic material and includes a cross sectional gap 9. The cross sectional gap 9 enables cross sectional deformation of the pump guard 2. Specifically, first and second guard portions 28a and 28b are moved in opposite directions, as indicated by arrows 30a and 30b in FIG. 3. In this manner, by flexing or bending the pump guard 2 through pressure, stress, or other application of a deforming force, at least one cross sectional portion, and preferably a plurality of cross sectional portions, of the pump guard 2, are deformed from their natural shape to a deformed shape to permit free movement of the pump guard 2 about the pump guard engaging portions 24 of the pump 10. When the pump engaging portions 8 of the pump guard 2 have been properly aligned with the guard engaging portions 24 of the pump 10, the resilient pump guard 2 may be securely mounted about the pump 10, in the manner illustrated in FIG. 4, by allowing the pump guard 2 to return to its original or natural shape. Similarly, the pump guard 2 may be deformed to permit removal of the pump guard 2 from the pump 10. It is contemplated by the present invention that a variety of cross sectional gaps and other structural designs will permit the above described deformation of the pump guard 2. It will be appreciated by those skilled in the art that each particular pump guard 2 must be designed in accordance with the dimensions of the pump engaging portions 24 of a particular pump 10 to be shielded.

A further advantage of the cross sectional gap 9 is that it permits drainage of any fluid within the seal chamber 6. Accordingly, the cross sectional gap 9 is preferably positioned at the lowermost portion of the pump guard 2 such that fluid leaking from the seal 16 will tend to flow, under the influence of gravity, through the cross sectional gap 9.

The pump guard 2 illustrated in FIGS. 1–4 is formed of a transparent material so as to permit visual inspection of the seal 16 and associated pump hardware while the pump guard is installed about the seal; although, it may also be formed entirely of translucent or opaque material or of translucent or opaque material which has a transparent "inspection" window appropriately located therein. In at least one embodiment, the pump guard 2 includes at least one substantially circular cross sectional portion 26, i.e., the substantially circular cross sectional portion 26 substantially follows a circular contour. It will be appreciated by those skilled in the art that minor deviations in shape will be introduced in the particular guard molding process as a result of cooling or other common molding steps.

Having described the invention in detail and by reference to preferred embodiments thereof, it will be apparent that modifications and variations are possible without departing from the scope of the invention defined in the appended claims.

What is claimed is:

1. A pump guard comprising a flexible and resilient cross sectional portion having a natural cross sectional shape substanially conforming to the shape of a guard engaging portion of a pump, said flexible and resilient cross sectional portion being capable of deformation from said natural cross sectional shape to a deformed cross sectional shape and return to said natural cross sectional shape, wherein said cross sectional portion includes a cross sectional gap and wherein said pump includes a seal, said pump guard being adapted to define a seal chamber in the proximity of said seal, and said cross sectional gap being positioned so as to permit drainage of fluid from said seal chamber.

2. A pump guard as claimed in claim 1 wherein said pump guard comprises a plurality of flexible and resilient cross sectional portions having respective natural cross sectional shapes substantially conforming to the shape of corresponding guard engaging portions of said pump, said plurality of flexible and resilient cross sectional portions being capable of deformation from said respective natural cross sectional shapes to respective deformed cross sectional shapes and return to said respective natural cross sectional shapes.

3. A pump guard as claimed in claim 1 wherein said cross sectional portion follows a substantially circular contour.

4. A pump guard as claimed in claim 1 wherein said cross sectional gap is adapted to permit said deformation.

5. A pump guard as claimed in claim 1 wherein said pump includes a seal and said pump guard is adapted to deflect fluid leaking from said seal.

6. A pump guard as claimed in claim 1 wherein said pump guard is adapted to prevent passage of a fluid therethrough.

7. A pump guard as claimed in claim 1 wherein said pump guard is adapted to define a seal chamber in the proximity of a seal of said pump.

8. A pump guard as claimed in claim 1 wherein said pump guard comprises a transparent material.

9. A pump guard as claimed in claim 1, wherein said flexible and resilient material comprises a polycarbonate resin.

10. A pump guard as claimed in claim 1, wherein said flexible and resilient material comprises a polycarbonate having a thickness of about 3/16" (0.48 cm).

11. A pump guard as claimed in claim 1 wherein said pump guard a unitary structure.

12. A pump guard as claimed in claim 1 wherein said pump guard is adapted to be secured to said pump exclusive of guard mounting hardware.

13. A method of installing a pump guard comprising the steps of:

deforming at least one flexible and resilient cross sectional portion of a pump guard from a natural cross sectional shape to a deformed cross sectional shape;

positioning said pump guard adjacent a seal of a pump by enclosing said seal so as define a seal chamber and positioning a cross sectional gap provided in said pump guard so as to permit drainage of fluid from said seal chamber; and returning said at least one cross sectional portion of said pump guard to said natural cross sectional shape following said positioning step wherein said natural cross sectional shape substantially conforms to the shape of a guard engaging portion of said pump.

14. A method of installing a pump guard as claimed in claim 13 further comprising the steps of:

deforming a plurality of flexible and resilient cross sectional portions of said pump guard from respective natural cross sectional shapes to respective deformed cross sectional shapes;

positioning said pump guard adjacent a seal of a pump; and returning said plurality of cross sectional portions of said pump guard to said respective natural cross sectional shapes following said positioning step wherein said respective natural cross sectional shapes substantially conform to the shape of a guard engaging portion of said pump.

15. A method of installing a pump guard as claimed in claims 13 wherein said positioning step comprises enclosing said seal with said pump guard so as to define a seal chamber of said pump.

16. A method of installing a pump guard as claimed in claim 13 wherein said deforming step comprises moving first and second guard portions in opposite directions.

17. A pump guard comprising a flexible and resilient material, said pump guard being shaped so as to form a shielding portion and a pump engaging portion, wherein said shielding portion is adapted to define a seal chamber in the proximity of a seal of a pump, wherein said pump engaging portion substantially conforms to the shape of a guard engaging portion of said pump, and wherein said pump guard further comprises a fluid drainage portion formed in said shielding portion so as to permit drainage of fluid from said seal chamber.

18. A pump guard as claimed in claim 17 wherein said shielding portion is adapted to prevent passage of a fluid therethrough.

19. A pump guard as claimed in claim 17 wherein said flexible and resilient material comprises a transparent material.

20. A pump guard as claimed in claim 17 wherein said flexible and resilient material comprises a polycarbonate resin.

21. A pump guard as claimed in claim 17 wherein said flexible and resilient material includes a cross sectional gap adapted to permit deformation of said pump guard.

22. A pump guard as claimed in claim 17 wherein said fluid drainage portion comprises a cross sectional gap provided in said shielding portion.

23. A fluid pump comprising:

a fluid inlet;

a fluid outlet;

an impeller casing arranged to permit passage of fluid from said fluid inlet to said fluid outlet through said impeller casing;

a rotary pump drive;

a mechanical seal coupled to the rotary pump drive and operative to prevent fluid within the impeller casing from passing into the ambient;

a pump guard comprising a flexible and resilient material, said pump guard being shaped so as to form a shielding portion and a pump engaging portion, wherein said shielding portion is adapted to define a seal chamber in the proximity of said mechanical seal, wherein said pump engaging portion substantially conforms to the shape of a guard engaging portion of said pump.

24. A pump guard comprising a flexible and resilient cross sectional portion having a natural cross sectional shape substantially conforming to the shape of a guard engaging portion of a pump, said flexible and resilient cross sectional portion being capable of deformation from said natural cross sectional shape to a deformed cross sectional shape and return to said natural cross sectional shape, wherein said pump guard comprises a transparent material.

\* \* \* \* \*